(12) United States Patent
Ishikawa et al.

(10) Patent No.: US 11,065,689 B2
(45) Date of Patent: Jul. 20, 2021

(54) ADDITIVE MANUFACTURING WITH POLYGON AND GALVO MIRROR SCANNERS

(71) Applicant: Applied Materials, Inc., Santa Clara, CA (US)

(72) Inventors: David Masayuki Ishikawa, Mountain View, CA (US); Paul J. Steffas, Santa Clara, CA (US); Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 280 days.

(21) Appl. No.: 15/953,329

(22) Filed: Apr. 13, 2018

(65) Prior Publication Data

US 2018/0369960 A1     Dec. 27, 2018

Related U.S. Application Data

(60) Provisional application No. 62/524,436, filed on Jun. 23, 2017.

(51) Int. Cl.
*B22F 10/20* (2021.01)
*B33Y 10/00* (2015.01)
(Continued)

(52) U.S. Cl.
CPC .............. *B22F 10/20* (2021.01); *B22F 3/003* (2013.01); *B22F 12/45* (2021.01);
(Continued)

(58) Field of Classification Search
None
See application file for complete search history.

(56) References Cited

U.S. PATENT DOCUMENTS

| 4,616,132 A | 10/1986 | Kessler |
| 4,643,569 A | 2/1987 | Sullivan et al. |

(Continued)

FOREIGN PATENT DOCUMENTS

| DE | 10 2010 04833 | 4/2012 |
| EP | 2926925 | 10/2015 |

(Continued)

OTHER PUBLICATIONS

International Search Report and Written Opinion in International Application No. PCT/US2018/038595, dated Oct. 17, 2018, 15 pages.

(Continued)

*Primary Examiner* — Geoffrey S Evans

(74) *Attorney, Agent, or Firm* — Fish & Richardson P.C.

(57) ABSTRACT

An additive manufacturing system includes a platform, a dispenser to dispense a plurality of layers of feed material on a top surface of the platform, a light source to generate a first light beam and a second light beam, a polygon mirror scanner, a galvo mirror scanner positioned adjacent to the polygon mirror scanner, and a controller. The controller is coupled to the light source, the polygon mirror scanner and the galvo mirror scanner, and the controller is configured to cause the light source and polygon mirror scanner to apply the first light beam to a region of the layer of feed material, and to cause the light source and galvo mirror scanner to apply the second light beam to at least a portion of the region of the layer of feed material.

12 Claims, 9 Drawing Sheets

(51) Int. Cl.

| | |
|---|---|
| *B23K 26/06* | (2014.01) |
| *B22F 3/00* | (2021.01) |
| *G02B 26/10* | (2006.01) |
| *G02B 26/12* | (2006.01) |
| *B33Y 30/00* | (2015.01) |
| *B22F 12/45* | (2021.01) |
| *B23K 26/082* | (2014.01) |
| *B23K 26/342* | (2014.01) |
| *B23K 26/067* | (2006.01) |
| *B33Y 40/00* | (2020.01) |
| *B22F 10/30* | (2021.01) |

(52) U.S. Cl.
CPC ...... *B23K 26/0608* (2013.01); *B23K 26/0626* (2013.01); *B23K 26/0673* (2013.01); *B23K 26/0676* (2013.01); *B23K 26/0821* (2015.10); *B23K 26/342* (2015.10); *B33Y 10/00* (2014.12); *B33Y 30/00* (2014.12); *G02B 26/105* (2013.01); *G02B 26/123* (2013.01); *B22F 10/30* (2021.01); *B33Y 40/00* (2014.12)

(56) References Cited

U.S. PATENT DOCUMENTS

| | | |
|---|---|---|
| 6,359,255 B1 | 3/2002 | Yamamoto et al. |
| 8,784,720 B2 | 7/2014 | Oberhofer et al. |
| 8,967,990 B2 | 3/2015 | Weidinger et al. |
| 9,073,260 B2 | 7/2015 | El-Siblani et al. |
| 9,073,261 B2 | 7/2015 | El-Siblani et al. |
| 9,073,262 B2 | 7/2015 | El-Siblani et al. |
| 9,079,355 B2 | 7/2015 | El-Siblani et al. |
| 9,415,443 B2 | 8/2016 | Ljungblad et al. |
| 2003/0052105 A1 | 3/2003 | Nagano et al. |
| 2006/0215246 A1 | 9/2006 | Kerekes et al. |
| 2010/0187207 A1 | 7/2010 | Lee et al. |
| 2011/0287570 A1 | 11/2011 | Katsura et al. |
| 2013/0001834 A1 | 1/2013 | El-Siblani et al. |
| 2013/0112672 A1 | 5/2013 | Keremes et al. |
| 2013/0189435 A1 | 7/2013 | Mackie |
| 2014/0198365 A1 | 7/2014 | Li et al. |
| 2014/0263209 A1 | 9/2014 | Burris et al. |
| 2014/0271328 A1 | 9/2014 | Burris et al. |
| 2015/0102531 A1 | 4/2015 | El-Siblani et al. |
| 2015/0283761 A1 | 10/2015 | Maeda et al. |
| 2016/0045989 A1 | 2/2016 | Bruck et al. |
| 2016/0052014 A1 | 2/2016 | Halder et al. |
| 2016/0114432 A1 | 4/2016 | Ferrar et al. |
| 2017/0021419 A1 | 1/2017 | Ng et al. |
| 2017/0021454 A1* | 1/2017 | Dallarosa ........... B23K 26/0869 |
| 2017/0021455 A1 | 1/2017 | Dallarosa et al. |
| 2017/0036404 A1 | 2/2017 | Rengers et al. |
| 2017/0144254 A1 | 5/2017 | Buller et al. |
| 2017/0165751 A1* | 6/2017 | Buller .................. B29C 64/40 |
| 2017/0173736 A1 | 6/2017 | Gray |
| 2017/0330370 A1 | 11/2017 | Kim et al. |
| 2018/0257299 A1 | 9/2018 | Ng et al. |
| 2018/0257300 A1 | 9/2018 | Ng et al. |
| 2018/0257301 A1 | 9/2018 | Ng et al. |
| 2018/0333918 A1 | 11/2018 | Sohn et al. |
| 2018/0339450 A1 | 11/2018 | Franklin et al. |
| 2018/0339454 A1 | 11/2018 | Franklin et al. |
| 2018/0369914 A1 | 12/2018 | Ishikawa et al. |
| 2021/0023789 A1 | 1/2021 | Ng et al. |

FOREIGN PATENT DOCUMENTS

| | | | |
|---|---|---|---|
| JP | 01316415 A | * 12/1989 | ......... B23K 26/0608 |
| JP | 03032481 A | * 2/1991 | |
| JP | 11-033752 A | 2/1999 | |
| JP | 2009-006509 | 1/2009 | |
| KR | 10-2003-0090042 | 11/2003 | |
| KR | 10-2006-0012398 | 2/2006 | |
| KR | 10-1612254 | 4/2016 | |
| KR | 10-2016-0057568 | 5/2016 | |
| KR | 10-2016-0109866 | 9/2016 | |
| KR | 10-1682087 | 12/2016 | |
| WO | WO 2009/026520 | 2/2009 | |
| WO | WO 2016/026706 | 2/2016 | |
| WO | WO 2016/051163 | 4/2016 | |

OTHER PUBLICATIONS

Extended European Search Report in European Appln. No. 18819783.4, dated Mar. 26, 2021, 6 pages.

\* cited by examiner

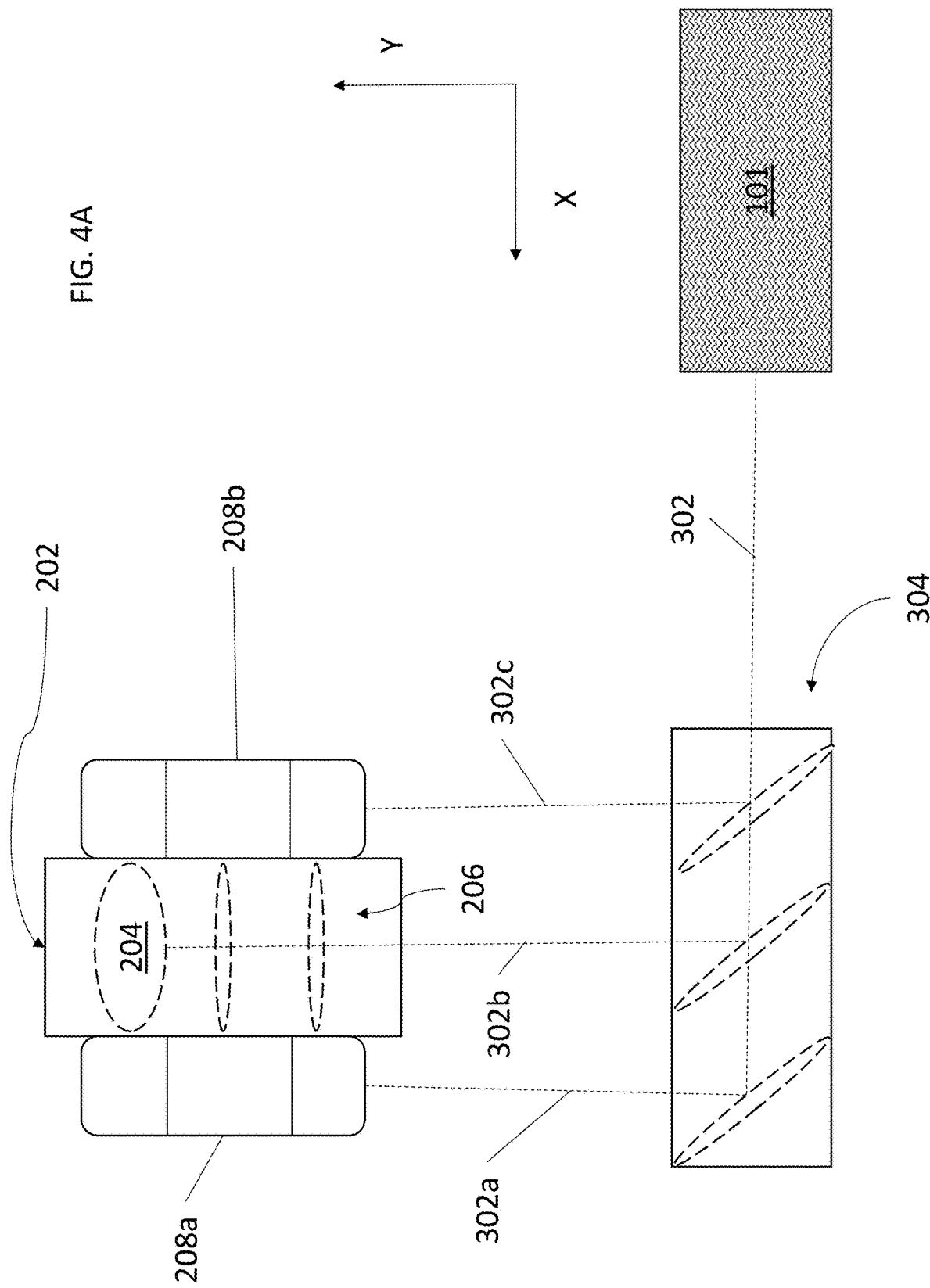

ADDITIVE MANUFACTURING WITH POLYGON AND GALVO MIRROR SCANNERS

CROSS-REFERENCE TO RELATED APPLICATIONS

This application is claims priority to U.S. Provisional Application Ser. No. 62/524,436, filed on Jun. 23, 2017, the entire disclosure of which is incorporated by reference.

TECHNICAL FIELD

This specification relates to additive manufacturing, also known as 3D printing.

BACKGROUND

Additive manufacturing (AM), also known as solid free-form fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

In some forms of additive manufacturing, a powder is placed on a platform and a laser beam traces a pattern onto the powder to fuse the powder together to form a shape. Once the shape is formed, the platform is lowered and a new layer of powder is added. The process is repeated until a part is fully formed.

SUMMARY

This specification describes technologies relating to additive manufacturing.

In one aspect, an additive manufacturing system includes a platform, a dispenser to dispense a plurality of layers of feed material on a top surface of the platform, a light source to generate a first light beam and a second light beam, a polygon mirror scanner configured to direct the first light beam light to impinge a layer of the feed material on the platform, a galvo mirror scanner positioned adjacent to the polygon mirror scanner, and a controller. The polygon mirror scanner is configured to direct the second light beam emitted to impinge the layer of the feed material on the platform. The controller is coupled to the light source, the polygon mirror scanner and the galvo mirror scanner, and the controller is configured to cause the light source and polygon mirror scanner to apply the first light beam to a region of the layer of feed material, and to cause the light source and galvo mirror scanner to apply the second light beam to at least a portion of the region of the layer of feed material.

Implementations may include one or more of the following features.

The controller may be configured to cause the light source and polygon mirror scanner to cause the first light beam to apply sufficient heat to raise a temperature of the feed material from a first temperature to a second temperature that is below a third temperature(TF) at which the feed material fuses. The controller may be configured to cause the light source and galvo mirror scanner to cause the second light beam to apply sufficient heat to the feed material while the temperature of the feed material has been raised by the first light beam to further raise the temperature of the feed material above the third temperature. The controller may be configured to cause the light source and galvo mirror scanner to cause the second light beam to apply sufficient heat to the feed material to further raise a temperature of the feed material above a temperature (TF) at which the feed material fuses. The controller may be configured to cause the light source and polygon mirror scanner to cause the first light beam to apply heat to the feed material after the feed material has been fused to control a rate of cooling of the feed material.

The light source is configured to apply sufficient heat to melt a metal powder. temperature of the feed material has been raised from a first temperature to a second temperature that is below a temperature (TF) at which the feed material fuses. The first light beam directed by the polygon mirror scanner may have a lower power density than the second light beam directed by the galvo mirror scanner.

A beam splitter may be configured to split a light beam emitted from a light source into the first light beam and the second light beam. The light source may include a first light source to emit the first light beam and a second light source to emit the second light beam.

The polygon mirror scanner may be a first polygon mirror scanner, and the additive manufacturing system may include a second polygon mirror scanner. The first polygon mirror may be configured to direct the light beam to at least a first half of the layer of the feed material on the platform, and the second polygon mirror may be to direct the light beam to at least a second half of the layer of the feed material on the platform. The controller may be configured to cause the light source and second polygon mirror scanner to cause a third light beam to apply heat to the feed material after the feed material has been fused to control a rate of cooling of the feed material.

A three-way beam splitter may be configured to split a first light beam emitted from the light source into a second light beam, a third light beam, and a fourth light beam. The second light beam may be directed at the first polygon mirror scanner, the third light beam may be directed at the galvo mirror scanner, and the fourth light beam may be directed at the second polygon mirror scanner. The light source may be a first light source that directs a first light beam to the first polygon mirror scanner, and the system may include a second light source directing a second light beam at the galvo mirror scanner, and a third light source directing a third light beam at the second polygon mirror scanner.

In another aspect, an additive manufacturing method includes pre-heating a first area of a layer of feed material on a platform below a caking temperature of the feed material by scanning a first light beam across the layer of feed material with a polygon mirror scanner, and fusing at least a portion of the first area of the layer of the feed material by scanning a second light beam across the layer of feed material with a galvo mirror scanner after the first area has been pre-heated.

Implementations may include one or more of the following features.

The first area may be heat-treated by reflecting a third light beam off the polygon mirror onto a first area of the layer of the feed material after the portion of the first area has been fused. The polygon mirror scanner may be a first polygon mirror. The first area may be heat-treated by reflecting a third light beam off a second polygon mirror scanner onto the first area of the layer of the feed material after the portion of the first area has been fused.

Pre-heating the layer of the feed material below the caking temperature may include scanning the first light beam with a first scanning pattern across the first area of the layer of the feed material. Fusing the first area of the layer of the feed material comprises scanning the second light beam with a second scanning pattern across the portion of the first area of the layer of the feed material. The first scanning pattern may differ from the second scanning pattern. An outline of a pattern for a part may be fused in the first area by the second light beam only.

After pre-heating the first area of the layer of the feed material, a second area of the layer of the feed material may be pre-heated with the polygon mirror scanner reflecting the first light beam onto the second area of the layer of the feed material, the second area being different from the first area of the layer of the feed material. After fusing the first area of the layer of the feed material, the second area of the layer of the feed material may be fused with a galvo mirror scanner reflecting the second light beam onto the second area of the layer of the feed material after the first area has been pre-heated, the second area being different from the first area of the layer of the feed material.

In another aspect, an optical engine includes a light source configured to emit a light beam, a beam splitter configured to split a first light beam emitted from the light source into a second light beam and a third light beam, a polygon mirror scanner configured to direct the second light beam to impinge a layer of a feed material on a platform, and a galvo mirror scanner positioned adjacent to the polygon mirror scanner, the galvo mirror scanner configured to direct the third light beam to impinge a layer of the feed material on the platform.

Implementations may include one or more of the following features.

The beam splitter may further split the first light beam into a fourth light beam. The polygon mirror scanner may be a first polygon mirror scanner, and the optical engine may include a second polygon mirror scanner configured to direct the fourth light beam to impinge a layer of the feed material on the platform. The first polygon mirror scanner may be capable of scanning at least a first half of the platform, and the second polygon mirror scanner may be capable of scanning at least a second half of the platform.

Particular implementations of the subject matter described in this specification can be implemented so as to realize one or more of the following advantages. Pre-heating and post-heating can be controlled. The amount of power needed by the beam used for fusing can be reduced, and/or the beam can move more quickly across the layer and thus can increase throughput. In addition, the size of temperature fluctuations can be reduced, and thus thermal stress can be reduced and material properties of the object being fabricated can be improved. Use of a rotating polygon to pre-heat or heat-treat the powder can permit heating to be applied to a small area at high speed/low power, and the powder can be treated with repetitive scans to simulate heating by an array of lamps.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4A is a schematic diagram of a top view of an example optical engine.

Like reference numbers and designations in the various drawings indicate like elements.

DETAILED DESCRIPTION

An additive manufacturing process can involve dispensing a layer of feed material, for example, a powder, on a platen or a previously deposited layer, followed by a method to fuse portions of the layer of feed material. An energy source heats up the feed material and causes it to solidify, e.g., to cause the powder to fuse. However, temperature fluctuations caused by the point-by-point sintering or melting of a powdered material can create thermal stresses within the printed object. These thermal stresses can cause parts to warp and crack during the manufacturing process. The thermal stresses can also cause porous regions to form.

In an additive manufacturing process, the feed material can be heated prior to being deposited over the platen. This can reduce the amount of power needed by the scanning beam to cause a particular voxel to solidify. This permits the beam to move more quickly across the layer, and thus can increase throughput. In addition, this can reduce the size of the temperature fluctuations, and thus reduce thermal stress and improve material properties.

Pre-heating a platform that supports the powder can reduce the thermal fluctuations and increase throughput for shallow parts, but fails to alleviate cracking and deformation for deeper parts where the depth of the part is too great for a pre-heated platform to sufficiently heat. Other pre-heating methods can result in "caking" of the majority of the powder on the platform and renders the powder unsuitable for reuse.

However, a feed powder can be pre-heated by a scanned light beam prior to fusing in order to reduce the thermal gradient during the manufacturing process, which can improve sintering quality and throughput. The reduced thermal gradient can at least partially reduce thermal stresses during the manufacturing process. Heat can also be applied by a scanned light beam to the fused sections after fusing (also referred to as "heat-treating" or "post-heating") in order to control the rate of cool-down and thereby reduce residual stresses and further improve sintering quality, e.g., by reducing the likelihood of warping and cracking of the part. The heat can also be used to compensate for thermal non-uniformity due to radiative, convective, and conductive losses.

This disclosure describes a method and apparatus for additive manufacturing. The apparatus can include an optical engine with at least one galvo mirror scanner and at least one polygon mirror scanner. An optical assembly that includes such an optical engine is capable of directing one or more light beams to pre-heat, fuse, and/or heat-treat a feed material during the manufacturing process.

Figure 1:
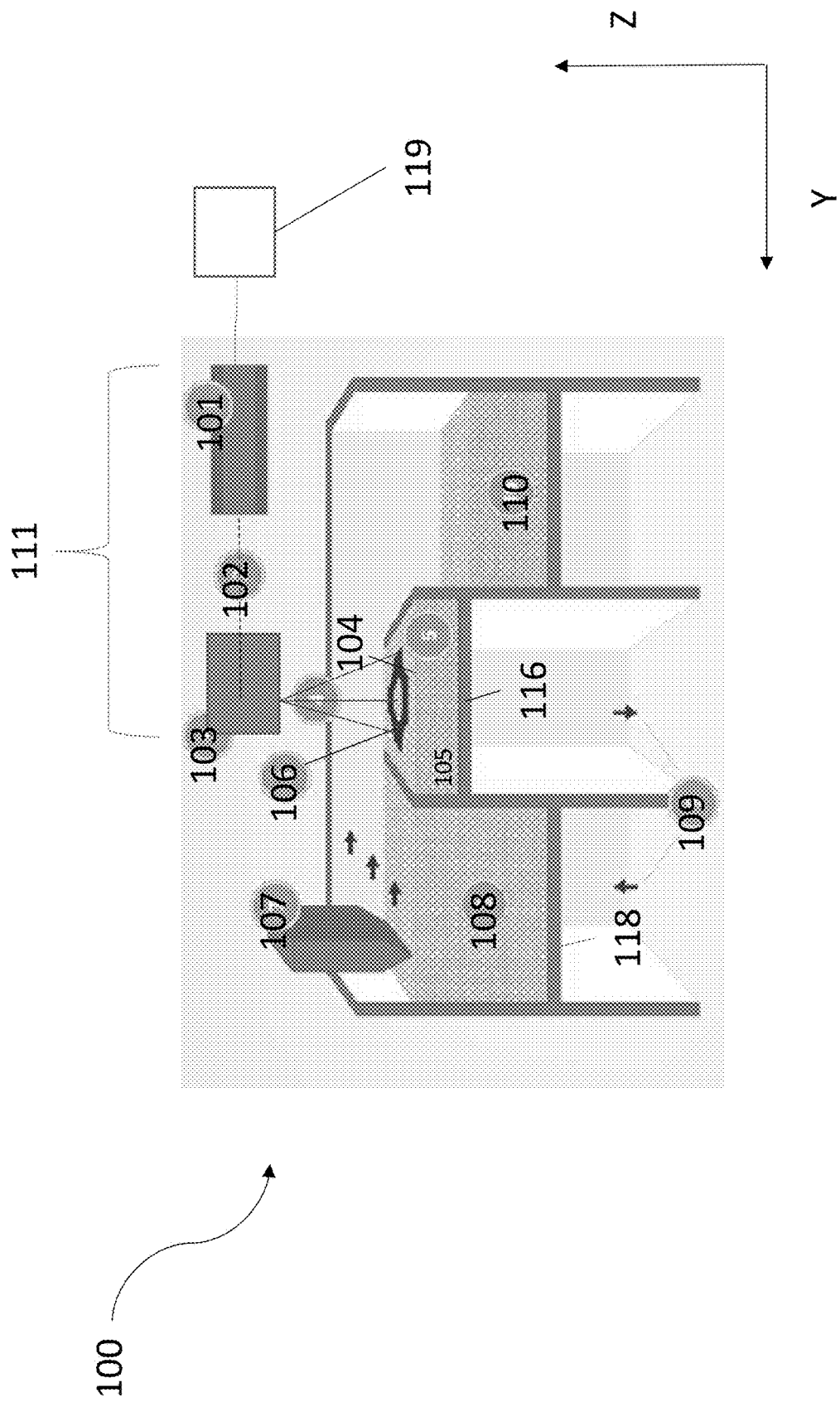
FIG. 1 is a schematic diagram of a perspective cross-sectional view of an example additive manufacturing system.

FIG. 1 shows an example additive manufacturing system 100. The additive manufacturing system 100 includes a build platform 116 to hold the object being fabricated, a feed material delivery system to deliver successive layers of feed material over the support 102, and an optical assembly 111 to generate multiple light beams that will be used for fusing, pre-heating and/or heat-treatment of each layer of feed material.

In some implementations, such as the implementation illustrated in FIG. 1, the feed material delivery system 107 can include a flat blade or paddle to push a feed material from a feed material reservoir 108 across the build platform 116. In such an implementation, the feed material reservoir 108 can also include a feed platform 118 positioned adjacent the build platform 116. The feed platform 118 can be elevated to raise some feed material above the level of the build platform 116, and the blade can push the feed material 104 from the feed platform 118 onto the build platform 116.

Alternatively or in addition, the feed material delivery system 107 can include a dispenser suspended above the platform 116 and that has a plurality of apertures or nozzles through which the powder flows. For example, the powder could flow under gravity, or be ejected, e.g., by piezoelectric actuator. Control of dispensing of individual apertures or nozzles could be provided by pneumatic valves, microelectromechanical systems (MEMS) valves, solenoid valves, and/or magnetic valves. Other systems that can be used to dispense powder include a roller having apertures, and an augur inside a tube having a plurality of apertures.

Optionally, the system 100 can include a compaction and/or levelling mechanism to compact and/or smooth the layer of feed materials deposited over the build platform 116. For example, the system can include a roller or blade that is movable parallel to the surface of the platform 116 by a drive system, e.g., a linear actuator.

The feed material 105 can include metallic particles. Examples of metallic particles include metals, alloys and intermetallic alloys. Examples of materials for the metallic particles include aluminum, titanium, stainless steel, nickel, cobalt, chromium, vanadium, and various alloys or intermetallic alloys of these metals.

The feed material 105 can include ceramic particles. Examples of ceramic materials include metal oxide, such as ceria, alumina, silica, aluminum nitride, silicon nitride, silicon carbide, or a combination of these materials, such as an aluminum alloy powder.

The feed material can be dry powders or powders in liquid suspension, or a slurry suspension of a material. For example, for a dispenser that uses a piezoelectric printhead, the feed material would typically be particles in a liquid suspension. For example, a dispenser could deliver the powder in a carrier fluid, e.g. a high vapor pressure carrier, e.g., Isopropyl Alcohol (IPA), ethanol, or N-Methyl-2-pyrrolidone (NMP), to form the layers of powder material. The carrier fluid can evaporate prior to the sintering step for the layer. Alternatively, a dry dispensing mechanism, e.g., an array of nozzles assisted by ultrasonic agitation and pressurized inert gas, can be employed to dispense the first particles.

The additive manufacturing system 100 includes a controller 119 that can store digital data representing a pre-defined pattern that can form the object 106. The controller 119 controls the optical assembly 111 to generate multiple light beams that will be used for fusing, pre-heating and/or heat-treatment of the layer of feed material.

The optical assembly 111 includes a light source 101 to generate a light beam 102 to impinge an outermost layer 104 of the feed material 105. The light beam 102 selectively delivers sufficient heat to fuse the feed material 105 in the pre-defined pattern stored in the controller 119. Fusing in the context of this specification can include melting and solidification, or sintering while still in solid form, or other processes of fusing a powder. While the illustrated implementation utilizes a single light source emitting a single light beam, multiple light sources can be used to generate multiple light beams. Examples of such implementations are given in greater detail later within this disclosure.

The light beam 102 is caused by the optical engine 103 to scan at least along a first axis (also referred to as a Y-axis). The optical engine 103 is controlled by the controller 119 and is described in greater detail later within this disclosure.

The Y-axis can be parallel to the direction of motion of the dispenser 107 (e.g., from left to right in FIG. 1), e.g., the blade or nozzles, across the platform. Alternatively, the Y-axis can be perpendicular to the direction of motion of the dispenser 107.

Movement along the X-axis can be facilitated by motion of platform 116, motion of a support holding the optical engine 103, by tilting a portion of the optical engine about the Y-axis, or by a separate galvo mirror scanner positioned before or after the optical engine 103 and within the path of the light beam to deflect the light beam along the X-axis. Different light beams can use different mechanisms, e.g., the rotating polygon scanner can be moved laterally by an actuator to provide motion along the X-axis, whereas the galvo mirror scanner can have a second galvo mirror scanner to provide movement of the light beam along the X-axis. In some implementations, motion of the different light beams along the X-axis can be independently controlled. In some implementations, e.g., where the scanners are attached to the same support that is laterally movable, the light beams have a fixed relative position along the X-axis.

Figure 2A:
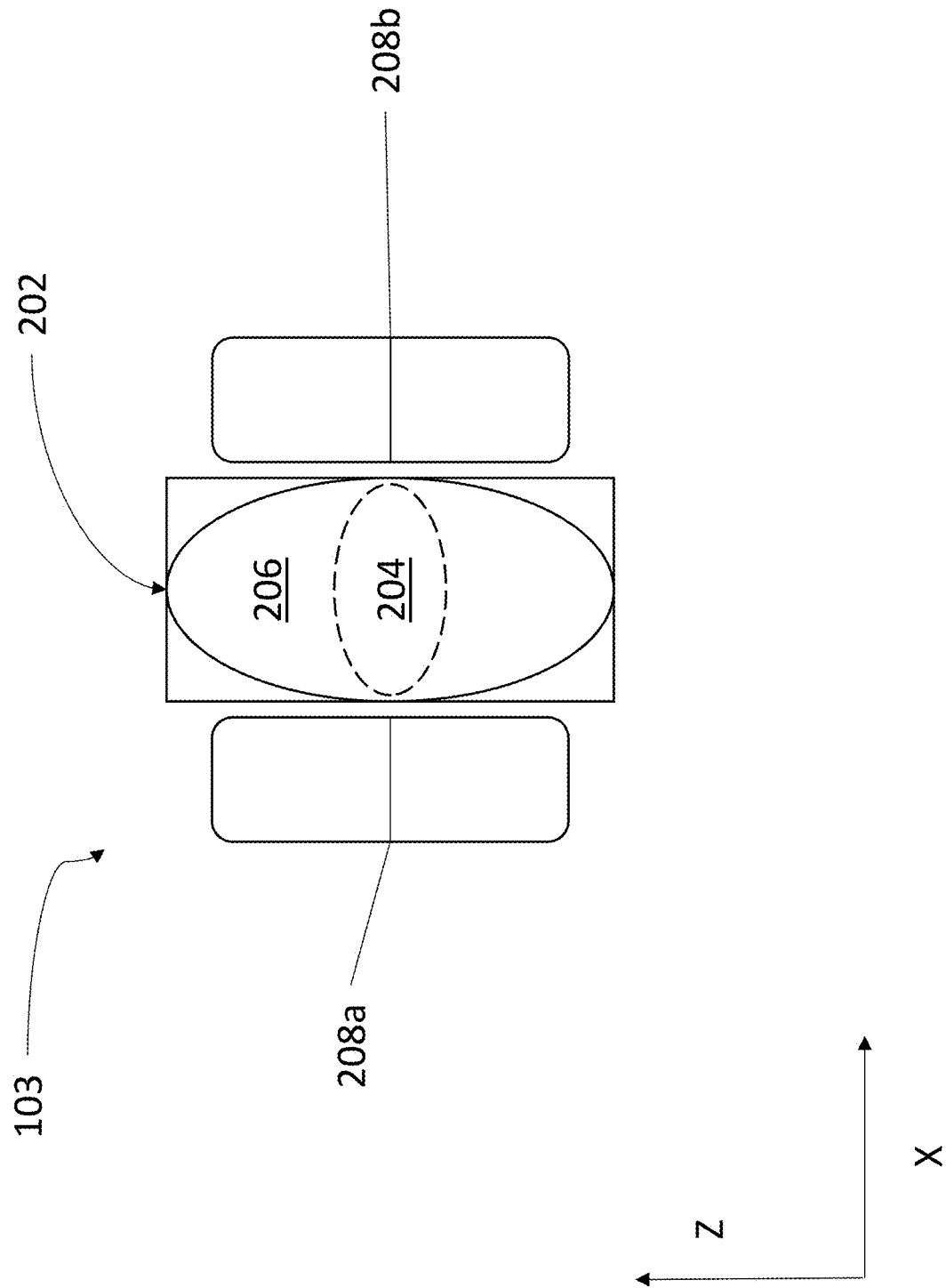
FIG. 2A is a schematic diagram of a front view of an example optical engine.
Figure 2B:
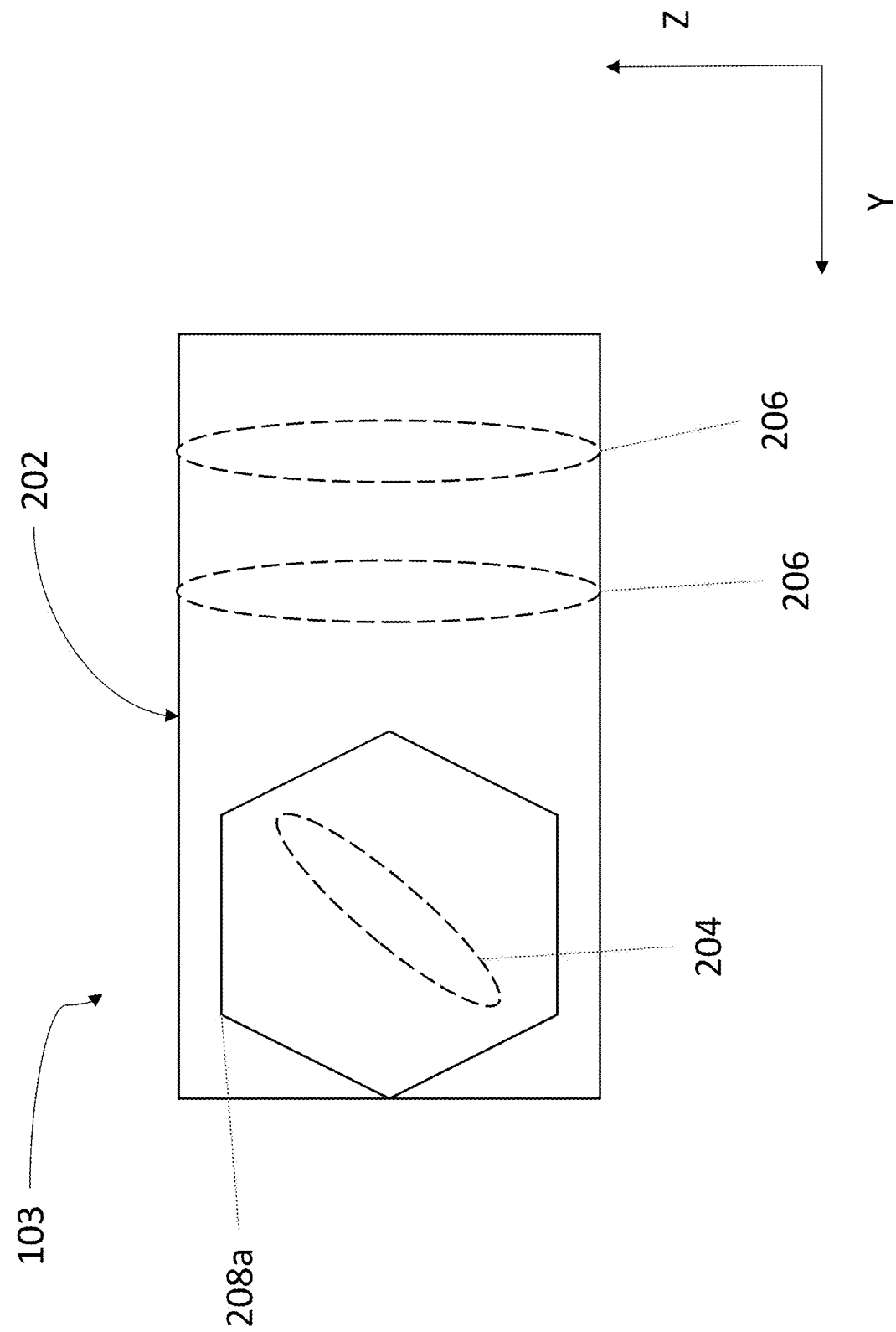
FIG. 2B is a schematic diagram of a side view of an example optical engine.

FIGS. 2A-2B show a front and side view, respectively of an example optical engine 103. The optical engine 103 can include a galvo mirror scanner 202 that includes a movable mirror 204 and focusing lenses 206. The galvo mirror scanner 202 can direct a light beam, such as light beam 102, to impinge a layer of the feed material 105 on the platform 116. The focusing lenses 206 focus the light beam 102 in order to gain optimal performance from the impingement. The galvo mirror scanner 202 can be used for pre-heating the feed powder 105, fusing the feed powder 105, or heat-treating the feed powder 105 after it is fused, or any combination. Heat-treating in the context of this disclosure includes controlling a rate of cooling of the feed material after it has been fused.

The optical engine 103 can also include a polygon mirror scanner 208a. The polygon mirror scanner can direct a light beam emitted by the light source 101, such as light beam 102, to impinge the layer of the feed material 105 on the platform 116. The polygon mirror scanner 208a can be positioned beside the galvo laser scanner 202 to be a part of the optical engine 103. The polygon mirror scanner 208a can be used for pre-heating the feed powder 105, heat-treating the feed powder 105 after the feed powder 105 has been fused, or both.

In some implementations, the optical engine 103 can include a second polygon mirror scanner 208b. The second polygon mirror scanner 208b can also be used for pre-heating the feed powder 105, heat-treating the feed powder 105 after it is fused, or both. In implementations where both the first polygon mirror scanner 208a and the second polygon mirror scanner 208b are used, the first polygon mirror scanner 208a can be used to pre-heat the feed powder 105 prior to fusing and the second polygon mirror 208b can be used to heat-treat the feed powder 105 after fusing. For example, light beams can be sent to both polygon mirror scanners 208a, 208b simultaneously, so that different portions of the layer of feed material are being pre-heated and heat-treated simultaneously.

In some implementation, both the first polygon mirror scanner 208a and the second polygon laser scanner 208b can be used for both pre-heating the feed powder 105 and heat-treating the feed powder 105 after it has been fused. In such an implementation, the first polygon laser scanner 208a can have a scanning range that covers at least one half of the platform 116 while the second polygon laser scanner 208b can have a scanning range that covers at least one half of the platform 116 that is separate from the half covered by the first polygon mirror scanner 208a.

Figure 3A:
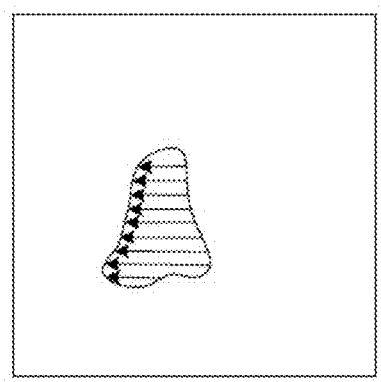
FIGS. 3A-3D are schematic diagrams of example scan paths.
Figure 3B:
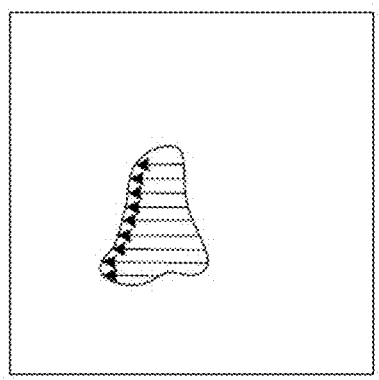
Figure 3C:
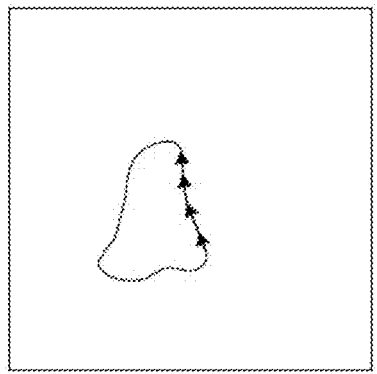
Figure 3D:
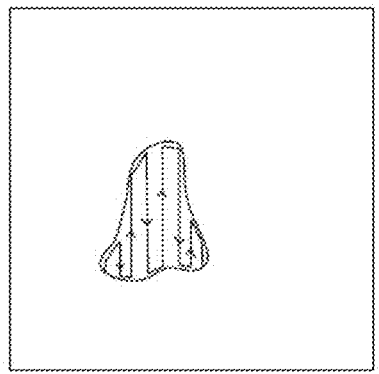

For each light beam, as the light beam sweeps along a path on the layer, the light beam can be modulated, e.g., by causing the respective light source to turn the light beam on and off, in order to deliver energy to selected regions of the layers of feed material 110. A set of example scan regions is shown in FIGS. 3A-3D. In FIG. 3A, a first light path can be traced with the galvo laser scanner 202. The light beam following this path can raise the temperature of a feed material above TF. In FIG. 3B, the first polygon mirror scanner 208a or the second polygon mirror scanner 208b can direct a light beam to scan the interior of the pattern outlined in FIG. 3A in order to pre-heat the feed material below TF. As shown in FIG. 3C, after area is pre-heated, the area can be fused by a light beam directed by the galvo mirror scanner following a different scan pattern. As shown in FIG. 3D, after the material is fused, the area can again be scanned with by a light beam with a different scan pattern directed by either the first polygon mirror scanner 208a or the second polygon mirror scanner 208b. While the illustrated implementation shows scans along the same area, different areas can be scanned simultaneously by the different optical components. This permits each light beam to pre-heat, fuse, and/or heat-treat independently selectable regions of the layer of feed material.

FIG. 4A shows an example of a light source 101 configuration that can be implemented with aspects of this disclosure. In the illustrated implementation, the light source 101 emits a first light beam 302 towards a beam splitter 304. The beam splitter 304 can split the first light beam 302 emitted from the light source 101 into a second light beam 302a, a third light beam 302b, and a fourth light beam 302c. The second light beam 302a is directed towards the first polygon mirror scanner 208a, the third light beam 302b is directed towards the galvo mirror scanner 202, and the fourth light beam 302c is directed towards the second polygon mirror scanner 208b. While the illustrated implementation shows the beam splitter 304 directing a light beam to three different optical components, the beam splitter 304 can be configured to direct any number of light beams. For example, if the optical engine 103 included only the first polygon laser scanner 208a and the galvo laser scanner 202, then the beam splitter 304 may only produce the second light beam 302a and the third light beam 302b. In some implementations, power density of the first light beam 302 can be modulated by the light source 101. In some implementations, the beam splitter can include a power density modulation mechanism for one or more of the light beams. In some implementations, one or more separate, stand-alone power density modulation mechanisms can be used.

Figure 4B:
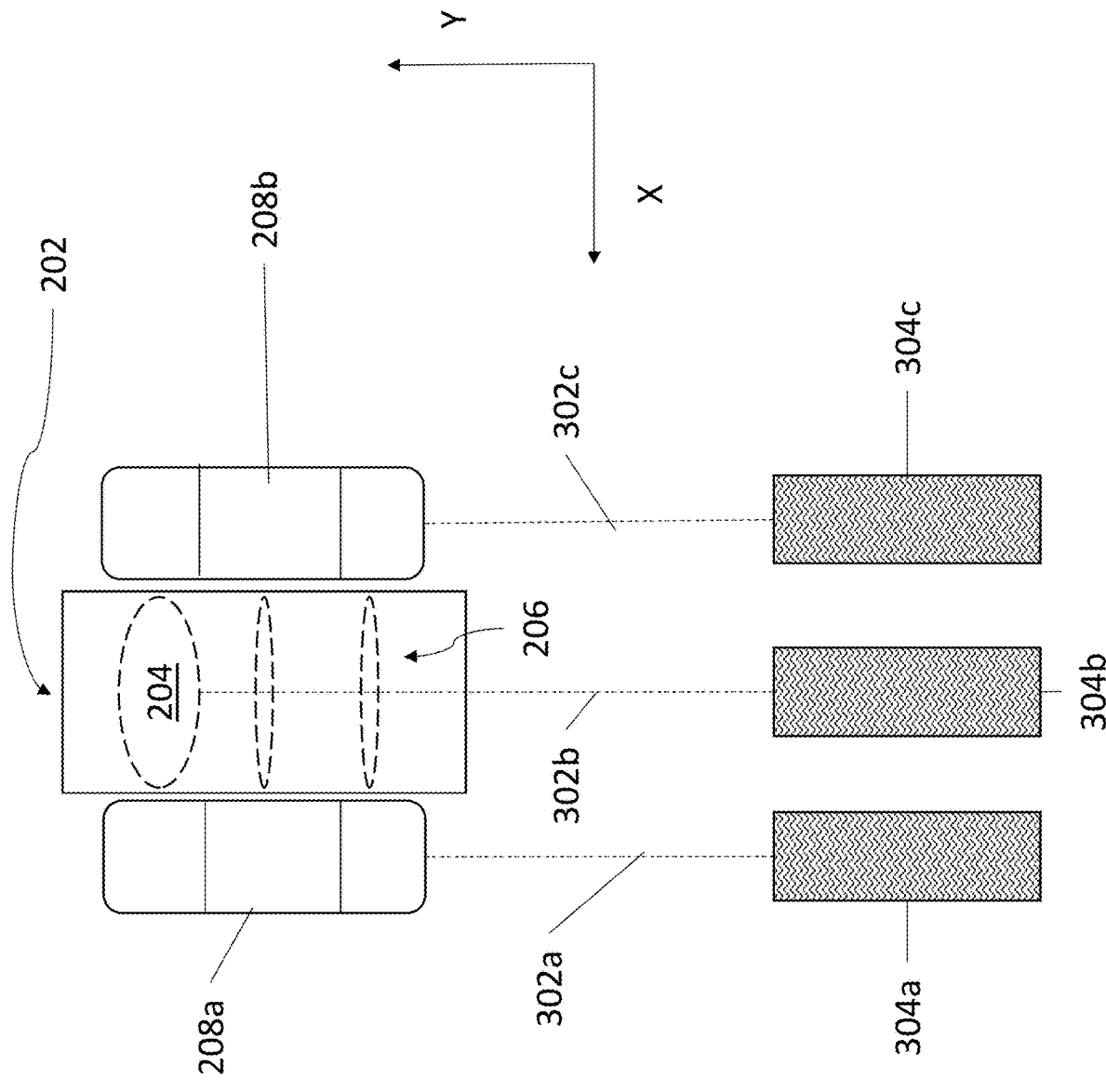
FIG. 4B is a schematic diagram of a top view of an example optical engine.

FIG. 4B shows an example optical engine that configuration that can be implemented with aspects of this disclosure. The illustrated implementation includes a first light source 304a, a second light source 304b, and a third light source 304c. The first light source 304a emits the first light beam 302a towards the first polygon laser scanner 208a. The second light source 304b emits the second light beam 302b towards the galvo mirror scanner 204. The third light source 304c emits the third light beam 302c towards the second polygon mirror scanner 208b.

While the illustrated implementation shows three separate light sources directing a light beam to three different optical components, any number of light sources can be used. For example, if the optical engine 103 included only the first polygon laser scanner 208a and the galvo laser scanner 202, then the first light source 304a and the second light source may be the only included light sources. Each of the light sources can individually modulate the power density of the light beams. In some implementations, one or more separate, stand-alone power density modulation mechanisms can be used.

While the beam splitter 304 and the use of multiple light sources 304a, 304b, and 304c have been described in separate implementations, the two concepts can be used in combination. For example, a first light beam can be emitted from a first light source towards a beam splitter. The beam splitter can split the first light beam into a second and third light beam. The second light beam can be directed to the first polygon mirror scanner 208a while the third light beam can be directed towards the second polygon mirror scanner 208b. A second light source can emit a fourth light beam towards the galvo mirror scanner 202.

Figure 5A:
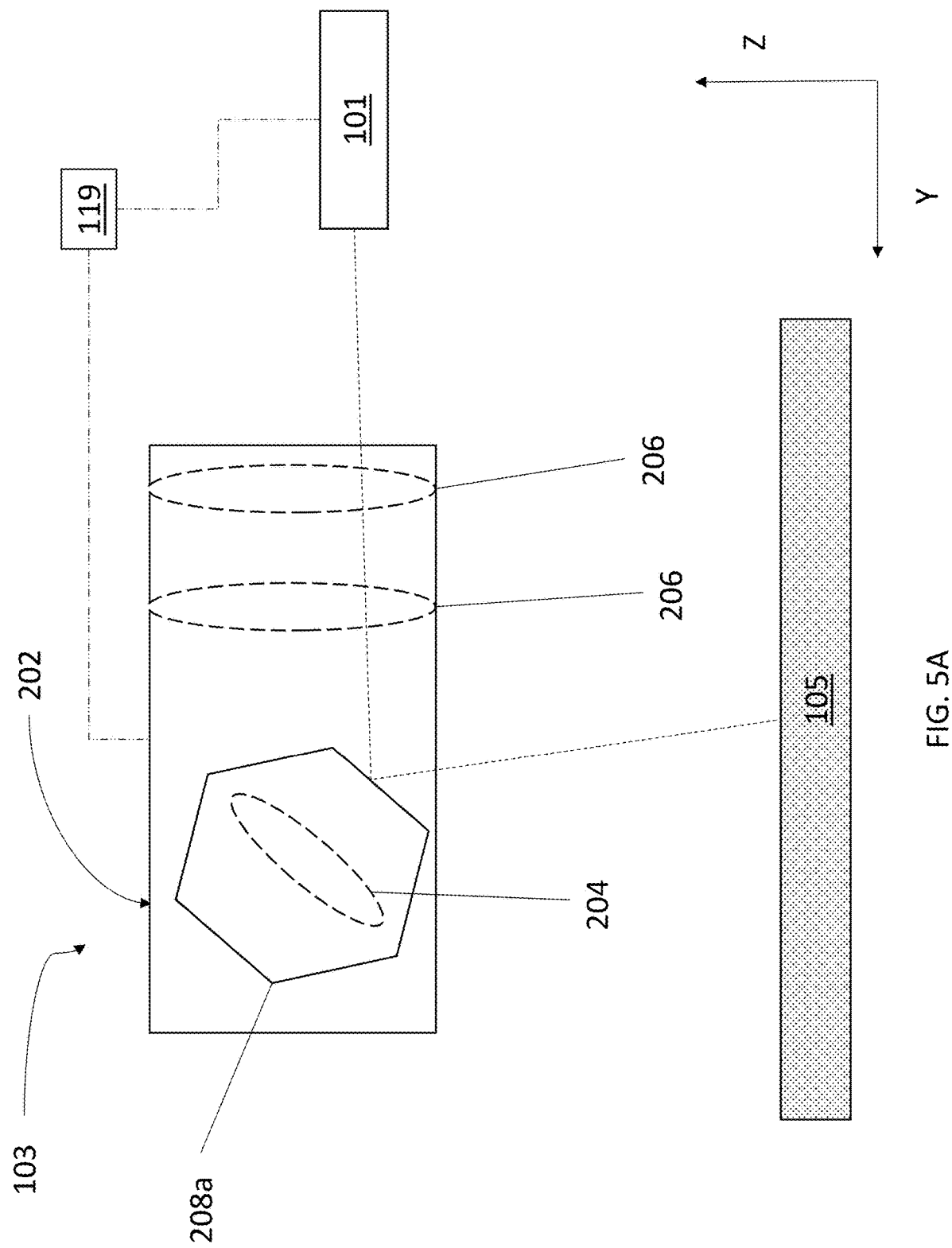
FIGS. 5A-5B are schematic diagrams of an example active optical assembly.
Figure 5B:
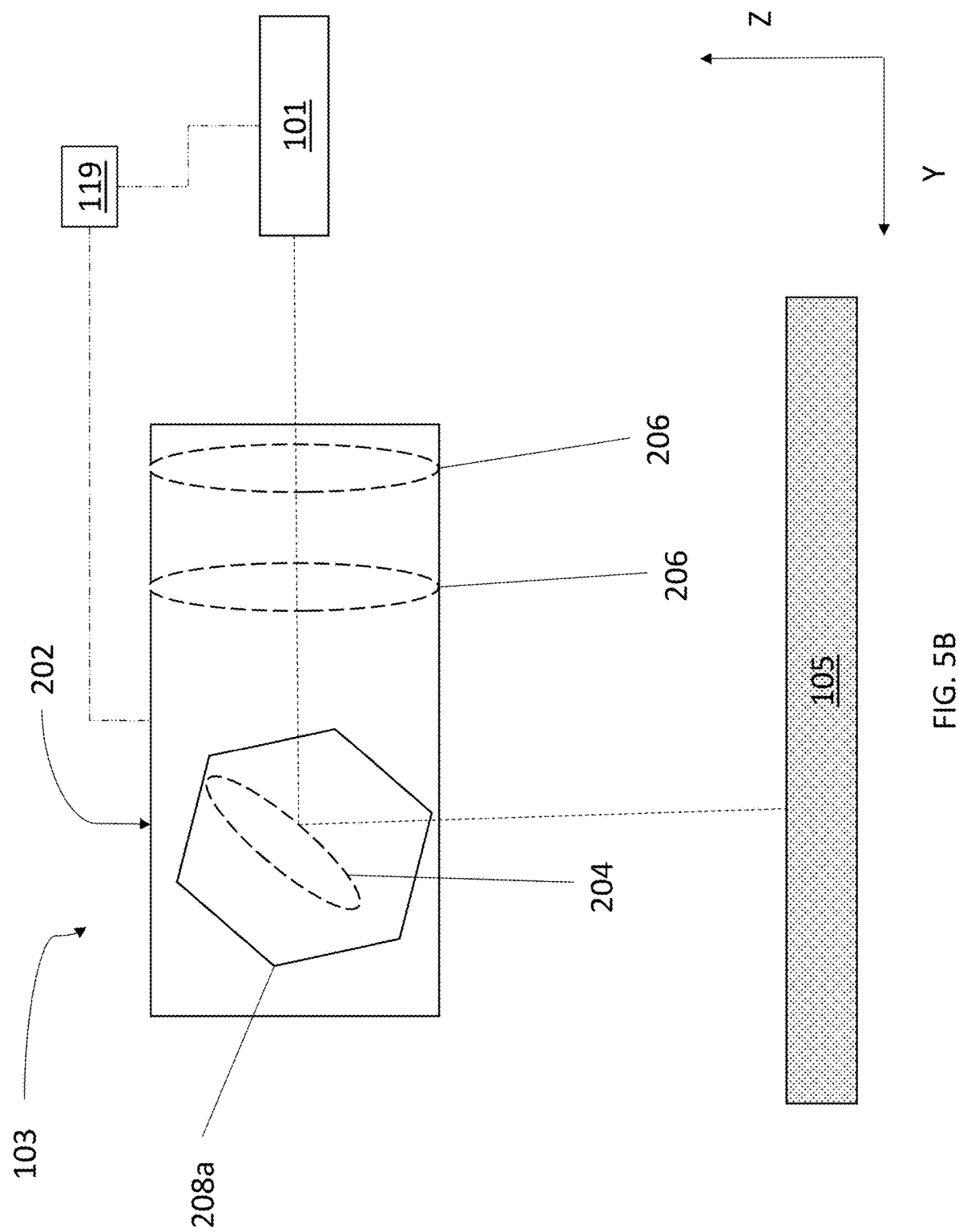

In some aspects of operation, the controller 119 can cause the light source 101 and polygon mirror scanner 208a to apply a first light beam to a region of the layer of feed material 105 as shown in FIG. 5A. The controller 119 can also cause the light source 101 and galvo mirror scanner 202 to apply a second light beam to at least a portion of the region of the layer of feed material 105 as shown in FIG. 5B.

In some implementations, the controller 119 can control the light source 101 and the polygon mirror scanner 208a to cause the first light beam 302a to apply sufficient heat to raise a temperature of the feed material 105 from a first temperature to a second temperature that is below a fusing temperature (a third temperature, TF, at which the feed material fuses. The second temperature can be below or above a temperature at which the feed material cakes. The controller can control the light source 101 and the galvo mirror scanner 202 to cause the second light beam 302b to apply sufficient heat to the feed material 105 while the temperature of the feed material has been raised by the first light beam 302a to further raise the temperature of the feed material above the fusing temperature TF.

In some implementations, the controller 119 can control the light source 101 and galvo mirror scanner 202 to cause the second light beam 302b to apply sufficient heat to the feed material 105 to further raise a temperature of the feed material above the fusing temperature TF, without the temperature being raised by a previous scanned light beam.

Independent of whether the polygon mirror scanner 208a is used to pre-heat the feed material 105, the optical assembly 111 can be used to cause the first light beam 302a to heat-treat the feed material. For example, the controller 119 can control the light source 101 and polygon mirror scanner 208a to cause the first light beam 302a to apply heat to the feed material 105 after the feed material 105 has been fused to control a rate of cooling of the feed material 105. As another example, the controller 119 can control the light source 101 and second polygon mirror scanner 208b to cause a third light beam 302c to apply heat to the feed material 105 after the feed material 105 has been fused to control a rate of cooling of the feed material 105.

In some implementations, the light source is capable of applying sufficient heat to melt a metal powder to raise a temperature of the feed material 105 from a first temperature to a second temperature that is below the fusing temperature TF. In some implementations, the first light beam 302a directed by the polygon mirror scanner 208a has a lower power density than the second light beam 302b directed by the galvo mirror scanner 202. In some implementations, the third light beam 302c directed by the polygon mirror scanner 208b has a lower power density than the second light beam 302b directed by the galvo mirror scanner 202.

Figure 6:
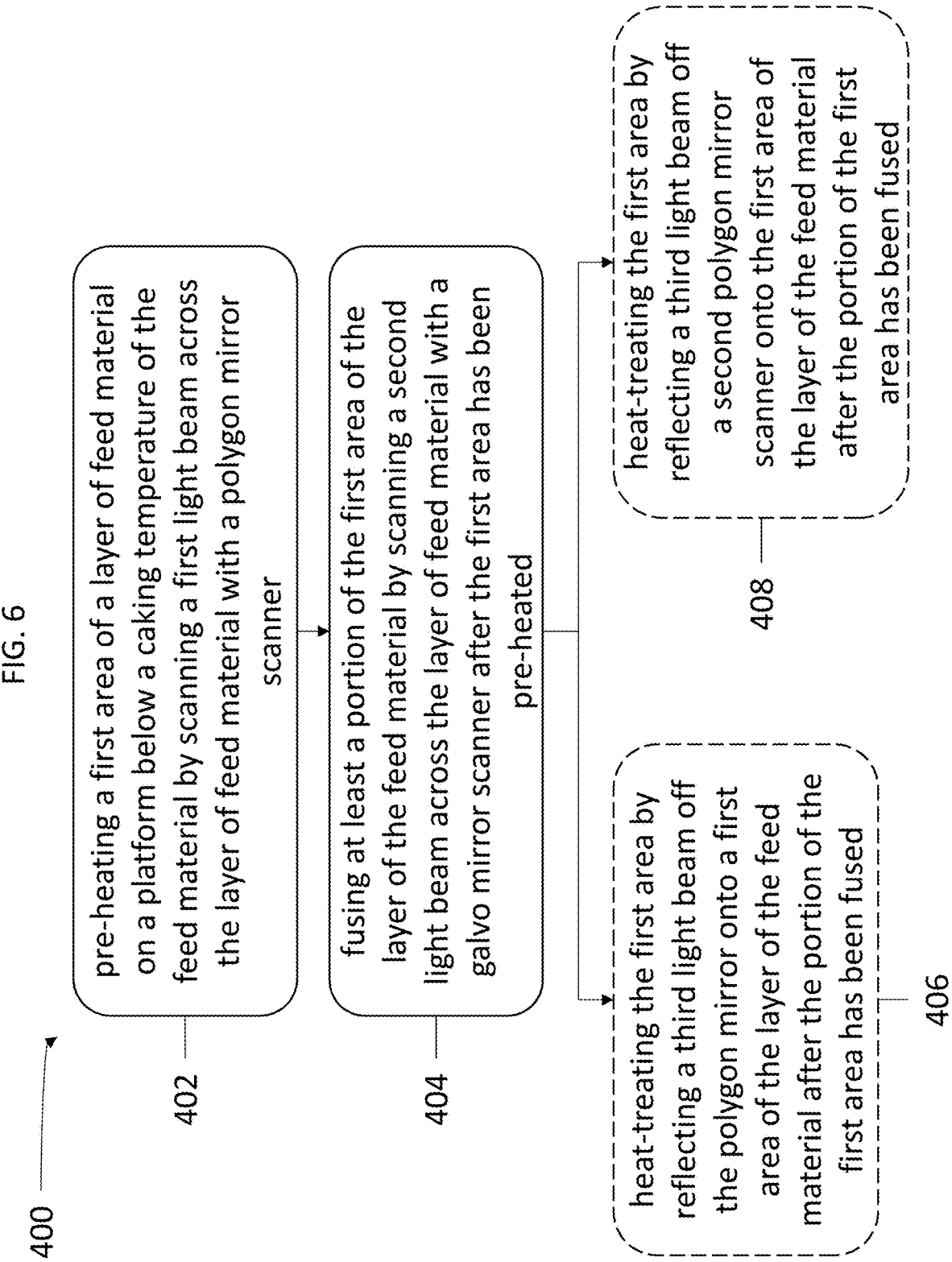
FIG. 6 is a flowchart of an example method of additive manufacturing.

FIG. 6 is a flowchart of an example method 400 that can be used in conjunction with aspects of this disclosure. At 402, a first area of a layer of feed material is pre-heated on a platform below a caking temperature of the feed material by scanning a first light beam across the layer of feed material with a polygon mirror scanner, such as polygon mirror scanner 208a. Pre-heating the layer of the feed material below the caking temperature can include scanning the first light beam with a first scanning pattern across the first area of the layer of the feed material.

At 404, at least a portion of the first area of the layer of the feed material is fused by scanning a second light beam across the layer of feed material with the galvo mirror scanner 202 after the first area has been pre-heated. Fusing the first area of the layer of the feed material can include scanning the second light beam with a second scanning pattern across the portion of the first area of the layer of the feed material. The first scanning pattern can differ from the second scanning pattern. A timespan between scanning the first area of the layer of the feed material with the first light and scanning the first area with the second light is sufficiently short that the area retains the heat necessary for the subsequent light beam to fuse the material. For some implementations, this timespan can be in the millisecond range, e.g., 1-10 milliseconds.

At 406, the first area is heat-treated by reflecting a third light beam off the polygon mirror scanner, such as the polygon mirror scanner 208a, onto the first area of the layer of the feed material after the portion of the first area has been fused. Alternatively, at 408, the first area is heat-treated by reflecting a third light beam off a second polygon mirror scanner, such as polygon mirror scanner 208b, onto the first area of the layer of the feed material after the portion of the first area has been fused. In some implementations, an outline of a pattern for a part in the first area can be fused by the second light beam alone. Thus, in some implementations, the first area is heat-treated by reflecting a light beam off a polygon mirror scanner, but the area is not pre-heated (so step 402 does not occur).

In some implementations, the additive manufacturing system 100 includes another heat source, e.g., one or more IR lamps arranged to direct heat onto the uppermost layer of the feed material. After pre-heating the first area of the layer of the feed material using the other heat source, a second area of the layer of the feed material can be pre-heated with the polygon mirror scanner, such as the polygon mirror scanner 208a, reflecting the first light beam onto the second area of the layer of the feed material. The second area can be different from the first area of the layer of the feed material. After fusing the first area of the layer of the feed material, the second area of the layer of the feed material can be fused with a galvo mirror scanner, such as the galvo mirror scanner 202, reflecting the second light beam onto the second area of the layer of the feed material after the first area has been pre-heated. The second area can be different from the first area of the layer of the feed material.

Controllers and computing devices can implement these operations and other processes and operations described herein. As described above, the controller 119 can include one or more processing devices connected to the various components of the system 100. The controller 119 can coordinate the operation and cause the apparatus 100 to carry out the various functional operations or sequence of steps described above.

The controller 119 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 119 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 119, e.g., as controlled by firmware or software, can interpret the data object received from the computer to generate the set of signals necessary to control the components of the system 100 to fuse the specified pattern for each layer.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims.

Optionally, some parts of the additive manufacturing system 100, e.g., the build platform 116 and feed material delivery system 107, can be enclosed by a housing. The housing can, for example, allow a vacuum environment to be maintained in a chamber inside the housing, e.g., pressures at about 1 Torr or below. Alternatively the interior of the chamber can be a substantially pure gas, e.g., a gas that has been filtered to remove particulates, or the chamber can be vented to atmosphere. Pure gas can constitute inert gases such as argon, nitrogen, xenon, and mixed inert gases.

In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An additive manufacturing system comprising:
    a platform;
    a dispenser to dispense a plurality of layers of feed material on a top surface of the platform;
    a light source to generate a first light beam and a second light beam;
    a polygon mirror scanner configured to direct the first light beam to impinge a layer of the feed material on the platform;
    a galvo mirror scanner configured to direct the second light beam to impinge the layer of the feed material on the platform; and
    a controller coupled to the light source, the polygon mirror scanner and the galvo mirror scanner, the controller configured to cause the light source and polygon mirror scanner to apply the first light beam to a region of the layer of feed material, and to cause the light source and galvo mirror scanner to apply the second light beam to at least a portion of the region of the layer of feed material.

2. The system of claim 1, wherein the controller is configured to cause the light source and polygon mirror scanner to cause the first light beam to apply sufficient heat to raise a temperature of the feed material from a first temperature to a second temperature that is below a third temperature($T_F$) at which the feed material fuses.

3. The system of claim 2, wherein the controller is configured to cause the light source and galvo mirror scanner to cause the second light beam to apply sufficient heat to the feed material while the temperature of the feed material has been raised by the first light beam to further raise the temperature of the feed material above the third temperature.

4. The system of claim 1, wherein the controller is configured to cause the light source and galvo mirror scanner to cause the second light beam to apply sufficient heat to the feed material to further raise a temperature of the feed material above a temperature ($T_F$) at which the feed material fuses.

5. The system of claim 4, wherein the controller is configured to cause the light source and polygon mirror scanner to cause the first light beam to apply heat to the feed material after the feed material has been fused to control a rate of cooling of the feed material.

6. The system of claim 1, wherein the dispenser is configured to dispense a metal powder and the light source is configured to apply sufficient heat to melt the metal powder.

7. The system of claim 1, wherein the first light beam directed by the polygon mirror scanner has a lower power density than the second light beam directed by the galvo mirror scanner.

8. The system of claim 1 further comprising a beam splitter configured to split a light beam emitted from a light source into the first light beam and the second light beam.

9. The system of claim 1, wherein the light source comprises a first light source to emit the first light beam and a second light source to emit the second light beam.

10. The system of claim 1, comprising an optical engine including the polygon mirror scanner and the galvo mirror scanner, wherein the polygon mirror scanner is positioned adjacent to the galvo mirror scanner in the optical engine.

11. The system of claim 1, wherein the polygon mirror scanner and the galvo mirror scanner are secured to a common support that is laterally moveable relative to the platform.

12. The system of claim 1, wherein the controller is configured to cause the light source and galvo mirror scanner to cause the second light beam to fuse an outline of a part in the layer without pre-heating by the first light beam.

* * * * *